United States Patent [19]

Tomita

[11] Patent Number: 5,044,304
[45] Date of Patent: Sep. 3, 1991

[54] ILLUMINATED INDICATOR GAUGE

[75] Inventor: Kiyoshi Tomita, Saitama Prefecture, Japan

[73] Assignee: Kanto Seiki Co., Ltd., Omiya, Japan

[21] Appl. No.: 569,740

[22] Filed: Aug. 21, 1990

Related U.S. Application Data

[63] Continuation of Ser. No. 357,013, May 25, 1989, abandoned.

[30] Foreign Application Priority Data

Jun. 8, 1988 [JP] Japan ............................. 63-76248[U]

[51] Int. Cl.⁵ ............................................. G01D 13/20
[52] U.S. Cl. ................................... 116/286; 116/304; 116/305; 116/328; 116/DIG. 36; 250/463.1
[58] Field of Search ...................... 116/62.1, 286–288, 116/304, 305, 327–332, 334, 335, DIG. 6, DIG. 35, DIG. 45; 40/543; 250/463.1; 362/29, 30, 34, 84; 368/226, 227

[56] References Cited

U.S. PATENT DOCUMENTS

| | | | |
|---|---|---|---|
| 2,555,751 | 6/1951 | Madan | 116/332 |
| 2,680,813 | 6/1954 | Doyle | 368/226 |
| 3,744,236 | 7/1973 | Kishida | 368/226 |
| 4,020,203 | 4/1977 | Thuler | 250/458.1 |
| 4,536,656 | 8/1985 | Sowa | 250/463.1 |
| 4,561,042 | 12/1985 | Wehner et al. | 362/30 |
| 4,652,464 | 3/1987 | Ludlum et al. | 427/157 |
| 4,841,155 | 6/1989 | Ushida et al. | 250/463.1 |
| 4,878,453 | 11/1989 | Inoue et al. | 116/288 |

FOREIGN PATENT DOCUMENTS

| | | | |
|---|---|---|---|
| 835656 | 7/1949 | Fed. Rep. of Germany . | |
| 333991 | 1/1936 | Italy | 116/328 |
| 59-203919 | 11/1984 | Japan . | |
| 62-084169 | 10/1985 | Japan . | |
| 63-008465 | 6/1986 | Japan . | |
| 62-282225 | 12/1987 | Japan . | |

Primary Examiner—William A. Cuchlinski, Jr.
Assistant Examiner—W. Morris Worth
Attorney, Agent, or Firm—Foley & Lardner

[57] ABSTRACT

An indicator gauge is disclosed, which comprises a housing; a dial board installed in the housing; and a pointer arranged in such a manner that an elongate pointing portion moves over a front face of the dial board. A narrow band of fluorescent substance is centrally located longitudinally along the full length of the pointing portion. The narrow band is bordered on each side along the full length by remaining areas of the pointing portion free of any fluorescent substance to create a contrasting appearance for maintaining a distinction between the band and indicia on the dial board when subject to ultraviolet light. An ultraviolet lamp is arranged in front of the dial board and the pointer to excite and thus cause the fluorescent part of the pointer to emit visible light.

7 Claims, 1 Drawing Sheet

FIG. 3 *(PRIOR ART)*

ILLUMINATED INDICATOR GAUGE

This application is a division of application Ser. No. 07/357,013, filed May 25, 1989, now abandoned.

BACKGROUND OF THE INVENTION

1. Field of the Invention

The present invention relates in general to an illuminated indicator gauge, such as speedometer and tachometer used in a motor vehicle or the like, and more particularly to such a gauge having a dial board and a pointer which are illuminated by a light source.

2. Description of the Prior Art

Since many indicator gauges are used in surroundings which receive very little light, either naturally or artificially, various arrangements have been made to illuminate such gauges so that they can be easily read. Such gauges are generally provided with their own light source for the purpose of the above. Many types of gauges are so constructed that light rays from the light source are directed radially from outside of the dial board to illuminate the indicia of the dial board and the position of the indicator pointer.

One of the gauges of such types is shown in FIG. 3 of the accompanying drawings. The gauge comprises a housing 1 which has a base member 7 connected thereto. The movement 2 of the gauge is secured to the base member 7 through bolts 3. A spindle 4 extends forward from the movement 2 and passes through a bore (no numeral) of a dial board 5 which is arranged in front of the movement 2. A pointer 6 is connected to the leading end of the spindle 4, so that the pointer 6 can swingably move over the face of the dial board 5. A transparent cover 9 is fixed to a front open part of the housing 1. On an upper part of the housing 1, there is arranged a light source 8 from which visible light rays are emitted for illumination of the dial board 5 and the pointer 6.

However, due to its inherent construction, the gauge has the following drawback.

That is, because the illumination of the dial board 5 and that of the pointer 6 are equally and entirely made throughout the front surfaces of them, sufficient contrast is not provided therebetween. This will limit the reliability of sure distinction of the pointer 6 from its background that is the face of the dial board 5. This drawback will cause difficulties to arise in clearly and quickly reading the indicia on the dial board 5.

SUMMARY OF THE INVENTION

Thus, elimination of the above-mentioned drawback is an essential object of the present invention.

It is an object of the present invention to provide an indicator gauge wherein a longitudinally extending limited width part of a pointer is coated with a fluorescent substance and an ultraviolet lamp is arranged to excite and thus cause the fluorescent substance to emit visible light.

According to the present invention, there is provided an indicator gauge which comprises a housing; a dial board installed in the housing; a pointer arranged in such a manner that an elongate pointing portion thereof moves over a front face of the dial board; a fluorescent substance deposited on a longitudinally extending limited width part of the elongate pointing portion of the pointer, the limited width part being narrower than the pointing portion, the fluorescent substance emitting visible light when receiving ultraviolet rays; and an ultraviolet lamp arranged in front of the dial board and the pointer and generating ultraviolet rays upon electric energization thereof.

BRIEF DESCRIPTION OF THE DRAWINGS

Other objects and advantages of the present invention will become apparent from the following description when taken in conjunction with the accompanying drawings, in which:

FIG. 3 is a view similar to FIG. 1, but showing one conventional indicator gauge.

DETAILED DESCRIPTION OF THE INVENTION

Figure 1:
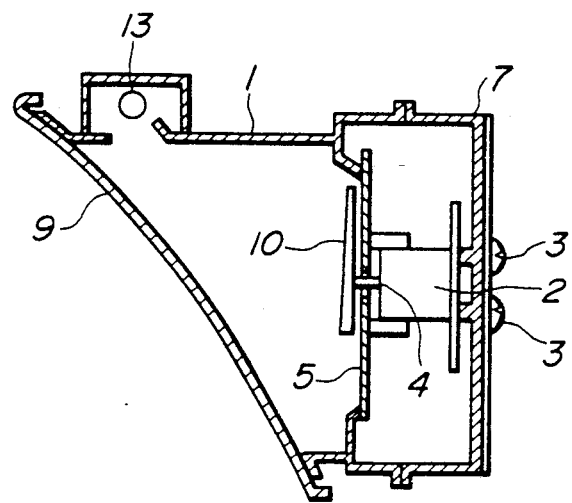
FIG. 1 is a sectional view of an indicator gauge according to the present invention.
Figure 2:
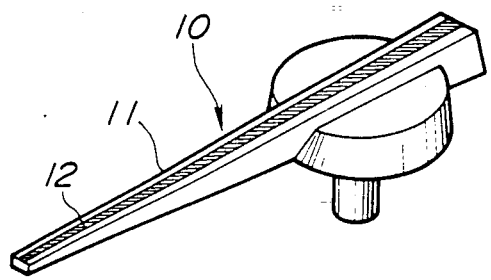
FIG. 2 is a perspective view of an indicator pointer which is used in the present invention.
Figure 2:
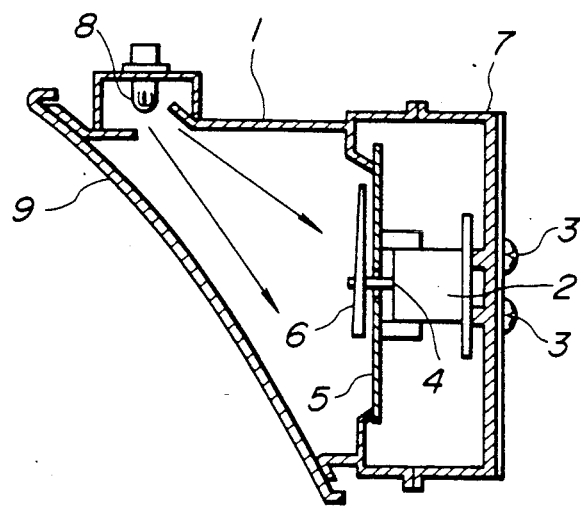

Referring to FIGS. 1 and 2, there is shown an indicator gauge according to the present invention. The gauge comprises a housing 1 with a base member 7, a movement 2, a spindle 4, a dial board 5, a pointer 10 and a transparent cover 9 which are arranged in substantially the same manner as the above-mentioned conventional gauge of FIG. 3.

However, in the present invention, the following measures are employed.

As is seen from FIG. 2, the pointer 10 has, at its elongate pointing portion 11, a longitudinally extending limited width part 12 coated with a fluorescent substance which emits visible light under the action of ultraviolet rays. The fluorescent part 12 is made narrower than the elongate pointing portion 11. The fluorescent substance is made of a paint mixed with a suitable fluorescent pigment. More specifically, the substance is a composition of an inked base resin and a fluorescent pigment, such as zinc sulfide, cadmium sulfide or the like. In view of antiweatherability, it is preferable to use a sulfide as the fluorescent pigment.

The dial board 5 has the indicia (or graduations) coated with the fluorescent substance.

Referring back to FIG. 1, an electric lamp 13 is arranged on an upper part of the housing 1, similar to the case of the above-mentioned prior art gauge. However, the electric lamp 13 used in the present invention is of an ultraviolet lamp which emits ultraviolet rays upon energization thereof.

When the ultraviolet lamp 13 is energized for example at night, ultraviolet rays are emitted from the lamp 13. Thus, the fluorescent part 12 of the pointer 10 and the fluorescent indicia of the dial board 5 are excited and thus generate visible light.

Because the light produced by such fluorescent portions shows a unique brightness and color, the distinction of the pointer 10 from the graduated face of the dial board 5 is reliably achieved by a viewer. Thus, clear and quick reading of the indicia on the dial board 5 is assured in accordance with the present invention.

What is claimed is:

1. An indicator gauge for use in a motor vehicle comprising:

a housing having a closed portion, an open portion and an interior;

a transparent cover covering said open portion of said housing;

a movement secured to said closed portion of said housing;

a spindle extending from said movement towards said interior of said housing;

a dial board installed in said housing having a front face which faces towards said transparent cover, said dial board having an opening through which said spindle passes and having a front face with indicia coated with a fluorescent substance;

a pointer connected to said spindle so that an elongate indicating portion thereof swingably moves over said front face of said dial board in response to operation of said movement with said indicating portion extending over a center of rotation of said pointer; and an ultraviolet lamp arranged at said open portion of said housing in a manner to be exposed to said interior of said housing, said ultraviolet lamp generating ultraviolet rays when electrically energized;

said elongate indicating portion having a single elongate surface oriented toward a driver's ordinary viewing position in said vehicle;

a narrow band of fluorescent substance centrally located longitudinally along the full length of said single elongate surface;

said narrow band being bordered on each side along said full length by remaining areas of said single elongate surface free of any fluorescent substance to create a contrasting appearance for maintaining a distinction between said band and said indicia on said dial board when subject to said ultraviolet rays.

2. An indicator gauge as claimed in claim 1 in which said fluorescent substance is made of a paint mixed with a fluorescent pigment.

3. An indicator gauge as claimed in claim 1, in which said fluorescent substance is a composition of an inked base resin and a fluorescent pigment.

4. An indicator gauge comprising:
a housing having a closed portion and an open portion;
a transparent cover covering said open portion of said housing;
a movement secured to said closed position of said housing;
a spindle extending from said movement toward said transparent cover;
a dial board having an opening through which said spindle passes, said dial board having a front face with indicia coated with a fluorescent substance;
a pointer connected to said spindle so that an elongate indicating portion thereof can swingably move over said front face of said dial board;
an ultraviolet lamp arranged in front of said dial board and said pointer, said lamp generating ultraviolet rays upon energization;
said elongate indicating portion having a single elongate surface oriented toward a driver's ordinary viewing position in said vehicle;
a narrow band of fluorescent substance centrally located longitudinally along the full length of said single elongate surface;
said narrow band being bordered on each side along said full length by remaining areas of said single elongate surface free of any fluorescent substance to create a contrasting appearance for maintaining a distinction between said band and said indicia on said dial board when subject to said ultraviolet rays.

5. An indicator gauge as claimed in claim 2 in which said fluorescent substance is made of a paint mixed with a fluorescent pigment.

6. An indicator gauge as claimed in claim 5 in which said fluorescent substance is a composition of an inked base resin and a fluorescent pigment.

7. An indicator gauge comprising:
a housing having a closed portion, an open portion and an interior, said closed portion comprising a vertical back portion and said open portion comprising an upper horizontal portion and a lower horizontal base portion, wherein said upper portion is longer than said lower portion;
a transparent cover being connected to a front edge of said upper portion and a front edge of said lower portion, said transparent cover covering said open portion of said housing;
a dial board mounted parallel to said back portion adjacent said front edge of said lower horizontal portion, said dial board having a front face with indicia coated with a fluorescent substance;
a movement arranged between said dial board and said back portion and being secured to said back portion with bolts;
a spindle extending from said movement towards said transparent cover through an opening of said dial board;
a pointer connected to said spindle so that an elongate indicating portion thereof swingably moves over said front face of said dial board in response to operation of said movement; and
an ultraviolet lamp arranged at said upper horizontal portion adjacent said front edge of said upper portion in a manner to be exposed to said interior of said housing, said ultraviolet lamp generating said ultraviolet rays when electrically energized and irradiating said dial board and said pointer with said ultraviolet rays;
said elongate indicating portion having a single elongate surface oriented toward a driver's ordinary viewing position in said vehicle;
said single elongate surface consisting of first, second and third equal length portions, each of said portions extending throughout the entire length of said single elongate surface;
said first portion of said single elongate surface being of limited width;
said second and third portions of said single elongate surface being located transversely of said first portion and immediately bordering said first portion on each side thereof, respectively;
said first portion of said single elongate surface being entirely covered with a deposited fluorescent substance emitting visible light when receiving said ultraviolet rays;
said second and third portions of said single elongate surface being entirely free of fluorescent substance and being of sufficient width to create a contrasting appearance for said fluorescent substance of said first portion for maintaining a distinction between said fluorescent substance of said first portion and said fluorescent substance of said indicia on said dial board when subject to said ultraviolet rays.

* * * * *